United States Patent
Schaefer, Jr.

[15] 3,664,367
[45] May 23, 1972

[54] TRAVELLING SPRINKLER SHUT OFF

[72] Inventor: George J. Schaefer, Jr., Beatrice, Nebr.

[73] Assignee: F. D. Kees Manufacturing Co., Beatrice, Nebr.

[22] Filed: Oct. 14, 1970

[21] Appl. No.: 80,588

[52] U.S. Cl. ............................................. 137/344, 239/183
[51] Int. Cl. ........................................ B05b 9/02, E01h 3/02
[58] Field of Search .................. 239/183; 137/344; 251/236, 251/237, 243, 75

[56] References Cited

UNITED STATES PATENTS

| | | | |
|---|---|---|---|
| 2,594,596 | 4/1952 | Stetson | 239/183 X |
| 3,037,484 | 6/1962 | Dixon | 251/75 X |
| 2,602,696 | 7/1952 | Salatin | 239/183 X |
| 2,731,982 | 1/1956 | Lodge | 251/236 X |
| 2,788,242 | 4/1957 | Jepson | 239/183 X |
| 3,085,751 | 4/1963 | Warrick et al. | 239/67 X |
| 3,327,946 | 6/1967 | Benson | 251/75 X |
| 3,446,235 | 5/1969 | Linderman | 137/344 |
| 3,515,350 | 6/1970 | Kruse et al. | 137/344 X |

*Primary Examiner*—Samuel Scott
*Attorney*—David H. Semmes

[57] ABSTRACT

A sprinkler shut off, more particularly an automatically operated sprinkler shut off valve mechanism for a travelling type of sprinkler. The mechanism includes a lever, attached to a valve shut off handle, engageable by an arm carried by the travelling sprinkler to turn the valve to an off position as the sprinkler moves into operative engagement therewith.

4 Claims, 5 Drawing Figures

PATENTED MAY 23 1972 3,664,367
INVENTOR
GEORGE J. SCHAEFER, JR.
BY David H. Semmes
ATTORNEY
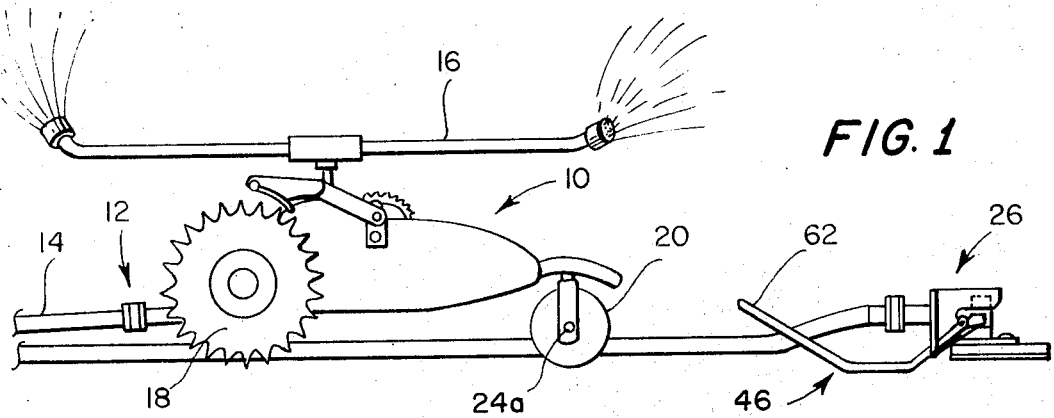
FIG. 1
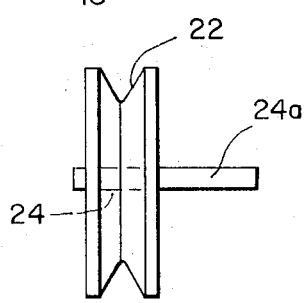
FIG. 2
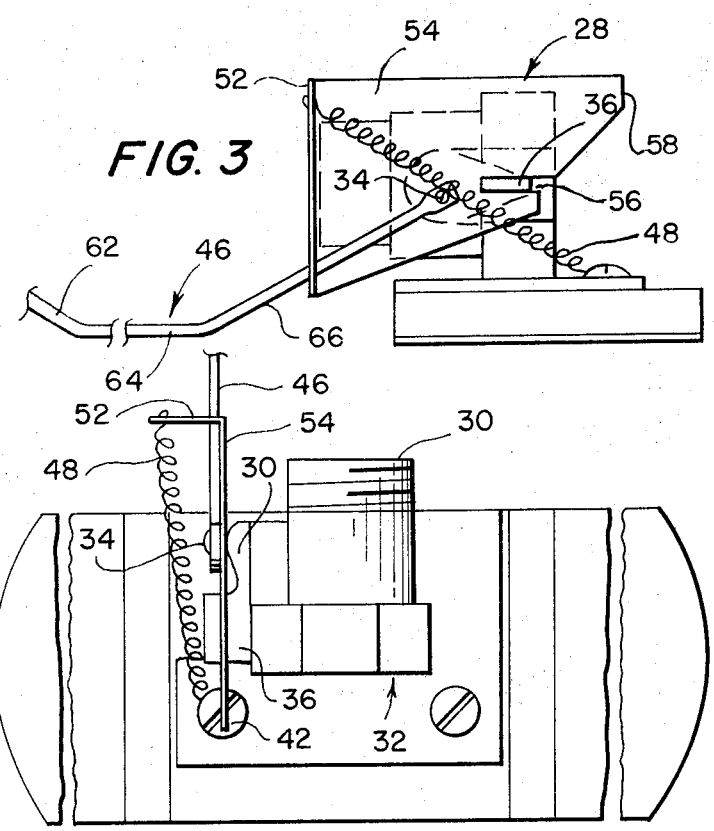
FIG. 3
FIG. 5
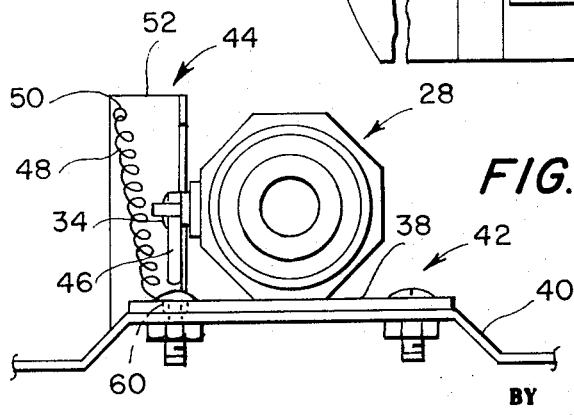
FIG. 4

TRAVELLING SPRINKLER SHUT OFF

BACKGROUND OF THE INVENTION

Travelling type sprinklers are in use which include sprinkler heads or nozzles mounted on a travelling conveyor adapted for movement over a desired lawn area or the like to be watered. The travelling conveyor normally includes driving wheels and a guide roller which may be engageable with or associated with a hose to which the sprinkler is connected, with the drive wheels driven by water power. The guide wheel in some designs consists of a grooved wheel engageable on the hose.

The normal operation of this type of travelling lawn sprinkler is to place the hose along a desired strip or area of lawn which it is desired to water and when the water is turned on the travelling conveyor moves along the hose length in an oriented direction. When a desired termination point of watering is reached, most times dictated by the hose length or point of attachment thereof to a supply of water, the water must be turned off to stop the travelling conveyor movement and deactivate the sprinkler. In some systems automatic shut offs are incorporated along a hose length.

SUMMARY OF THE INVENTION

The present invention is for an automatically operated sprinkler shut off mechanism for travelling types of sprinklers associated with a shut off valve. The travelling conveyor which mounts the sprinkler head or nozzles and operates to move the sprinkler over a defined path or area of a lawn of the like to be watered, preferably by engagement with a water hose which serves as a track for conveyor movement, includes means engageable with a lever operatively connected with a valve shut off handle and upon engagement automatically shuts off the valve.

In a preferred embodiment the travelling conveyor includes a front grooved guide wheel operatively associated with the sprinkler hose with the guide wheel being mounted on an elongated axle protruding laterally therefrom. The shut off valve has connected to the shut off handle thereof a bell crank lever to which is operatively attached an extended wire form engageable by the elongated axle, with the shape of the wire being such that continued movement of the travelling conveyor will turn the shut off valve handle associated with the bell crank lever and wire form to a valve closed position. Spring tension means are connected to the bell crank such that spring tension will snap the valve closed as the bell crank begins to move upward. An elongated foot is provided on the bell crank lever as a stop adapted to enter an elongated hole in a base for the valve.

Additional objects and advantages of the invention will be more readily apparent from the following detailed description of an embodiment thereof when taken together with the accompanying drawings in which:

FIG. 1 is a pictorial representation of a travelling sprinkler operatively associated with a water hose having a shut off valve connected therein adapted for closing actuation by the travelling conveyor;

FIG. 2 is a cross sectional view through a front guide wheel for the travelling conveyor associated with the water hose;

FIG. 3 is a side elevational view of the valve shut off mechanism of the invention;

FIG. 4 is a view taken at right angles to FIG. 3; and

FIG. 5 is a plan view of the mechanism shown in FIGS. 3 and 4.

Referring now in more detail to the drawings a travelling lawn sprinkler generally designated 10 is shown connected at 12 to a water hose 14 connectable to a usual type water supply system. The sprinkler includes nozzle mechanism 16, spiked or the like drive wheels 18 and a front guide wheel 20. The guide wheel 20 is grooved as at 22 and is rotatably mounted on axle 24 which is elongated at 24A so that it protrudes laterally from the front guide wheel. The basic travelling sprinkler construction is known. The elongated axle is provided for actuation of the sprinkler shut off of the present invention. An automatic shut off device generally designated 26 is operatively connected into the hose at any desired point, and in a usual situation about 25 feet from a sill cock. The travelling sprinkler is simply attached to the end of the hose and the conveyor creeps along under its own power using the hose as a track.

The sprinkler shut off which constitutes the present invention is incorporatable with shut off valves of different types. One satisfactory type of valve is that shown in U.S. Pat. No. 2,929,406 which is a ball type valve, generally shown in the drawings, consisting of a body or housing 28 connectable to hose sections through male coupling 30 and female coupling 32 in a known manner. The valve structure includes a ball valve body, not shown, having a handle 30 attached to the valve stem 32 by means of a screw 34. The handle includes a finger actuating portion 36. The ball valve is attached to a mounting plate 38 by glueing, welding and the like in a usual manner.

In practicing the invention, the mounting plate 38 is fastened to a steel or the like base plate 40 by means of screws and nuts 42, spot welds or the like. The base plate serves to support the valve structure on the soil. A bell crank lever generally designated 44, in the nature of a steel stamping, and a wire form 46 are mounted to the ball valve using the ball valve handle screw. A tension spring 48 is connected at 50 to off set plate 52 of the bell crank and the opposite end of the spring is connected with one screw and nut 42 to the mounting plate. Arm portion 54 of the bell crank is elongated as shown in FIG. 3 and incorporates a slot 56 in which finger actuating portion 36 of the handle is engaged. Arm portion 54 also includes an elongated foot 58 which in operation acts as a stop upon entering an elongated hole 60 punched in the metal base.

The wire form 46 includes an upwardly angled nose portion 62, an intermediate portion 64 and a rear portion 66 which at its end is attached to the valve stem. The intermediate portion 46 is adapted to rest on the soil surface and maintain the nose portion at an angle to be contracted by elongated axle portion 24A as the sprinkler approaches the wire. The elongated axle upon further movement of the sprinkler activates the wire in upward movement to an upward position. This in turn rotates the bell crank upward and spring tension from spring 48 will, in the nature of an over center type connection, snap the valve closed. Thereupon the elongated foot will serve to stop rotation of the crank and valve stem.

Operation of the invention will be readily apparent from the foregoing. As the sprinkler travels toward the cut off, engagement of the elongated axle with the wire form will serve to rotate the valve to the shut off position. Thereafter the sprinkler is moved to a subsequent area for subsequent activation. The automatic cut off can be inserted at any connection joint position in a hose and, being automatically actuatable, obviates attendance of the sprinkling operation for manually shutting off the water supply at the end of a path travel of the sprinkler.

Manifestly minor details of construction can be effected in the invention without departing from the spirit and scope thereof as defined in and limited solely by the appended claims.

I claim:

1. A travelling sprinkler shut off comprising:
   A. a rotatably actuable shut off valve adapted for connection with a water hose and including a valve stem;
   B. a rotatable lever attached to the shut off valve for operative rotative action thereof; including
      i. a bell crank, one leg of said bell crank being slotted and secured to said valve stem;
      ii. a valve handle attached to said stem and having a finger actuating portion engaged in said slot for rotation by said bell crank; said lever being engagable by the travelling sprinkler for rotation thereof and together therewith the valve to a closed position.
   C. a wire form including:
      i. an upwardly angularly disposed nose portion, ii. an intermediate portion adapted for ground rest, and iii. a rear end upwardly angularly disposed and secured at its terminus to said valve stem;

D. a front guide wheel and an elongated axle mount therefor, said elongated axle being engagable with said nose portion of said wire form and upon travel of the sprinkler actuating said wire form angularly upwardly for rotation of said valve to closed condition.

2. A travelling sprinkler shut off as claimed in claim 1, a base mounting said valve, a tension spring interconnecting said base and said bell crank and actuatable upon rotation of said bell crank by said wire form through spring tension to snap said valve closed.

3. A travelling sprinkler shut off as claimed in claim 2, said bell crank including a second leg angularly disposed with respect to said first leg, said spring having one end thereof connected to said second leg.

4. A travelling sprinkler shut off as claimed in claim 3, said first leg having an elongated foot portion, said base having an elongated hole therein, said elongated foot being engageable in said elongated hole and constituting a stop for the valve closing.

* * * * *